April 8, 1930. J. H. PORCHÉ 1,753,623
PIECES OF FURNITURE CAPABLE OF BEING SUPERPOSED
Filed Oct. 31, 1927 6 Sheets-Sheet 1

J. H. Porché
INVENTOR

By: Marks & Clark
ATTYS.

April 8, 1930.  J. H. PORCHÉ  1,753,623
PIECES OF FURNITURE CAPABLE OF BEING SUPERPOSED
Filed Oct. 31, 1927   6 Sheets-Sheet 2

J. H. Porché
INVENTOR

By: Marks & Clark
ATTYS.

April 8, 1930. J. H. PORCHÉ 1,753,623
PIECES OF FURNITURE CAPABLE OF BEING SUPERPOSED
Filed Oct. 31, 1927 6 Sheets-Sheet 4
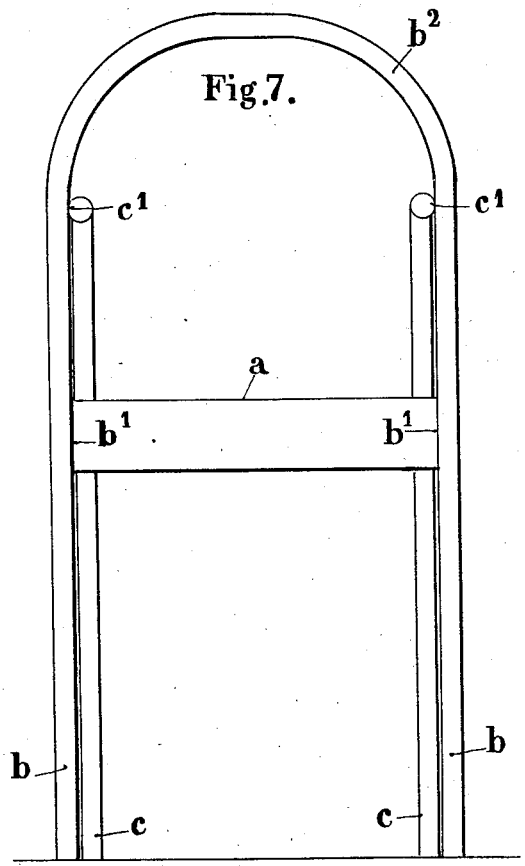
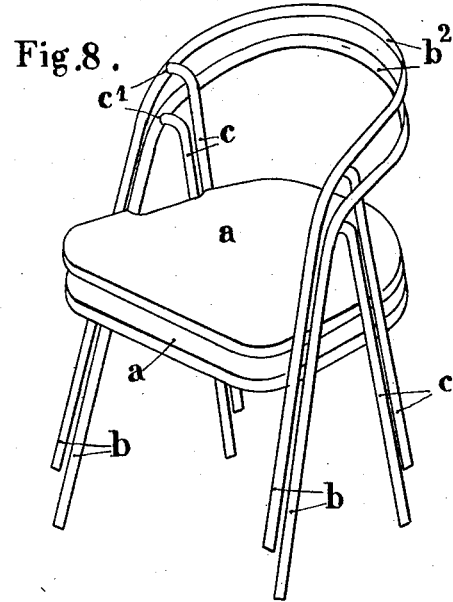
J. H. Porché
INVENTOR
By: Marks & Clark
Attys.

April 8, 1930. J. H. PORCHÉ 1,753,623
PIECES OF FURNITURE CAPABLE OF BEING SUPERPOSED
Filed Oct. 31, 1927 6 Sheets-Sheet 5

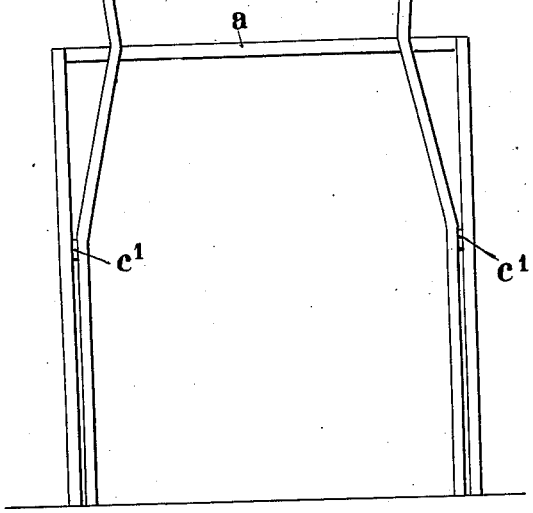
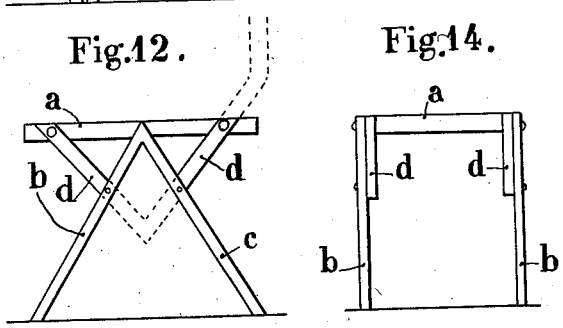
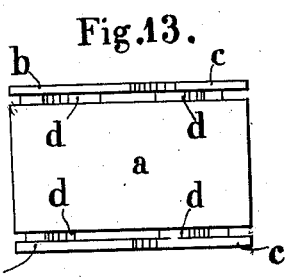

Patented Apr. 8, 1930

1,753,623

UNITED STATES PATENT OFFICE

JULIEN HENRI PORCHÉ, OF PARIS, FRANCE, ASSIGNOR TO SOCIETE DES MEUBLES SUPERPOSABLES, SOCIETE À RESPONSABILITE LIMITEE, OF GENNEVILLIERS, SEINE, FRANCE

PIECES OF FURNITURE CAPABLE OF BEING SUPERPOSED

Application filed October 31, 1927, Serial No. 230,130, and in France July 2, 1927.

The present invention has for object pieces of furniture having legs and provided or not with backs, the pieces of furniture being so devised that any number of them can be superposed and can be assembled together so as to present the minimum of cumbersomeness.

The pieces of furniture in accordance with the invention present the following features:
1. The surface adapted to constitute the seat of a chair, of an armchair, or the top of a piece of furniture is provided with front and rear legs, so arranged as to form together a certain angle and to project outside the sides of the seat which is thus offset for the purpose of permitting the easy and exact assemblage and without wedging of the legs on or in similarly arranged and shaped legs of other pieces of furniture of the same shape and of the same dimensions;
2. When the piece of furniture has a back, the latter is integral with the front legs or with the rear legs and the posts or uprights of this back are:
    (a) either secured at their base on the inner face of the rear legs and are thus offset relatively to the said legs;
    (b) or formed by extensions of the front legs the rear legs being, in this case, offset relatively to the front legs.

By the particular arrangement given to the legs and by the displacement or set-off given to the various constituent elements of the piece of furniture the latter can be conveniently placed on other similar pieces of furniture which exactly fit into each other by forming a pile the cumbersomeness of which can be equal to the place occupied on the ground by the legs of the lowest piece of furniture.

In order that the invention may be clearly understood, various modes of construction of seats devised in accordance with the said invention will be described hereinafter, by way of example only, with reference to the accompanying drawing in which:

Figs. 5, 6 and 7, illustrate in side view, plan view and front view respectively another form of construction.

Fig. 8 is a perspective view of two superposed seats in accordance with this second form of construction.

Figs. 9, 10 and 11 illustrate a third form of construction.

Figs. 12 to 14, illustrate a modification.

As shown in the accompanying drawing, the pieces of furniture which can be superposed and assembled in accordance with the invention comprise a plane horizontal surface $a$ adapted to constitute either the seat of a chair, armchair, sofa or the top of any piece of furniture; stool, table counter, for instance.

This surface $a$ which, in the various forms of construction illustrated in Figs. 1 to 11, constitutes the seat of chairs or armchairs, is provided, on each of its two lateral sides, with two legs $b$, $c$ which, according to the present invention are situated in a vertical plane outside the lateral sides of the seat $a$ and are arranged so as to form together a certain angle.

In the example shown in Figs. 1 to 4, the legs $b$ and $c$ are, in each pair, formed by means of a single bar of metal, wood or any other suitable material, bent at a certain point of its length and secured at $b^1$ at the front end of the seat $a$ at the top of the angle formed by the legs $b$, $c$.

Figure 1:
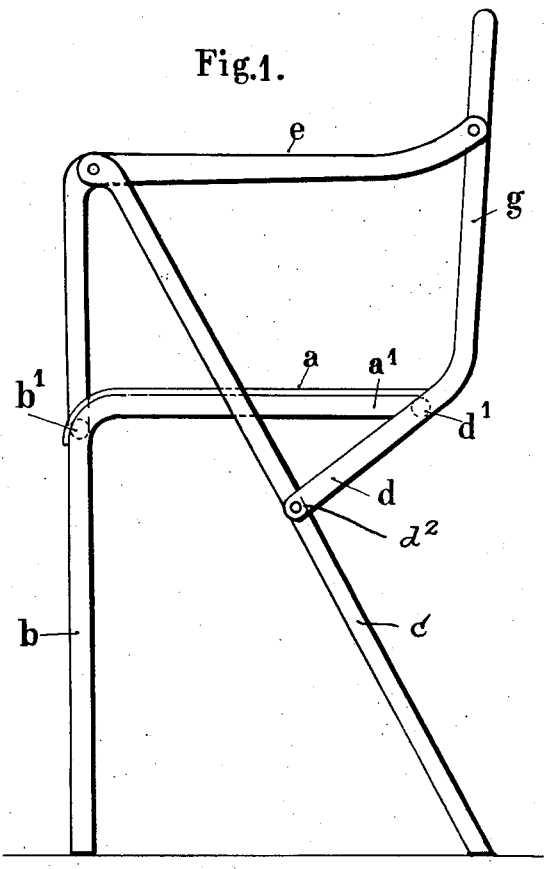
Figs. 1, 2 and 3 illustrate in side view, plan view and rear view respectively a first form of construction.
Figure 2:
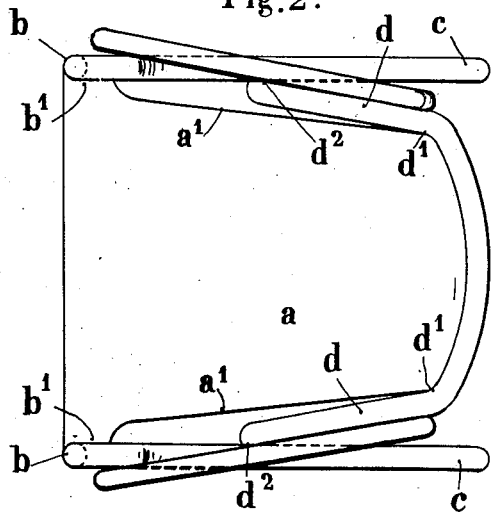
Figure 3:
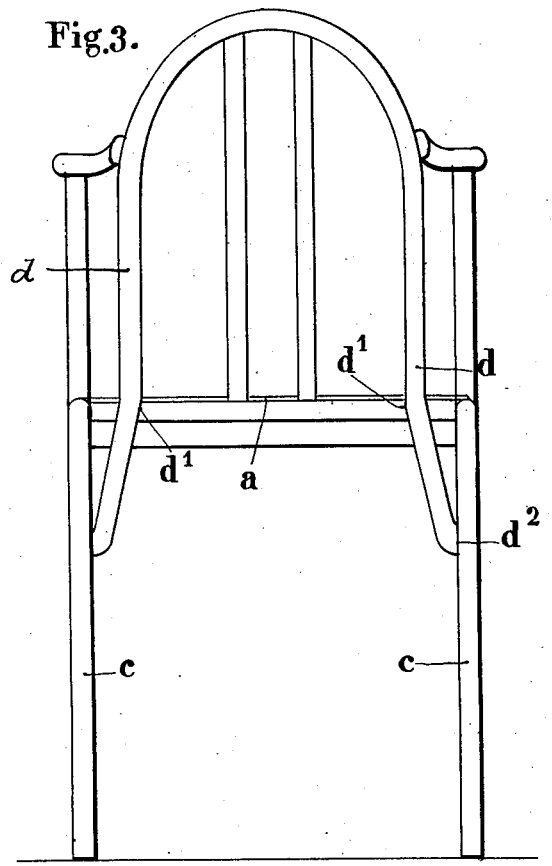

The front legs $b$, $b$ are vertical and the rear legs $c$, $c$, which are in the same plane as the legs $b$, are inclined, as clearly shown in Fig. 1 and are at a certain distance from the lateral sides of the seat $a$, which, as illustrated in Fig. 2, is cut away at $a^1$, $a^1$ beyond the point $b^1$ where the legs $b$, $b$ are secured.

This seat $a$ is connected, at the rear, to the two legs $c$, $c$ through the medium of two bars $d$, $d$ which, secured to the said seat at $d^1$ and on the inside of the legs $c$ at $d^2$, extend beyond the seat and form the back of the chair.

Figure 4:
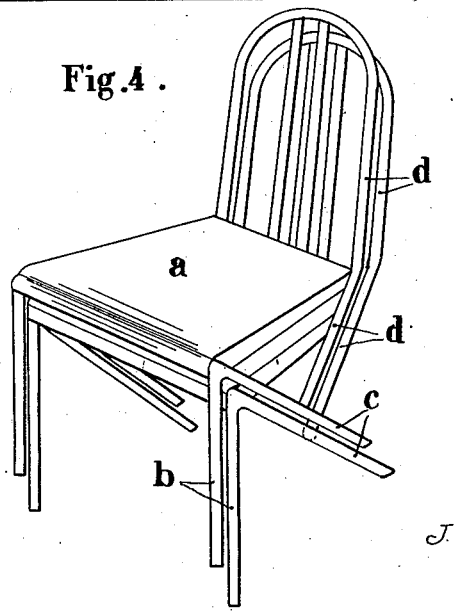
Fig. 4 is a perspective view showing two superposed seats similar to that shown in Figs. 1 to 3.

Referring to Figs. 2 and 4, it will be clearly seen that, owing to the offset arrangement of the seat $a$, of the posts or uprights $d$ of the back and of the legs $b$ and $c$, the angle formed by these latter is in a plane outside that of the other constituent elements of the chair and that in these conditions it is possible, as clearly shown in Fig. 4, to superpose any number of these chairs, the legs $b$ and $c$, seats $a$ and backs $d$ of which assemble together with the minimum of play, on the corresponding parts of the other chairs, and to thus form piles of pieces of furniture comprising, for a given height, the maximum number of these pieces of furniture.

In the form of construction above described the bisector of the angle formed by the legs $b$ and $c$ is inclined, so that the axis of the pile of superposed chairs is oblique.

In the form of construction illustrated in Figs. 5 to 8, the two front legs are constituted by a single bar $b$, which secured at $b^1$ on the two lateral sides of the seat $a$, extends above the latter in a part $b^2$ suitably bent for forming the hoop of the back.

Figure 6:
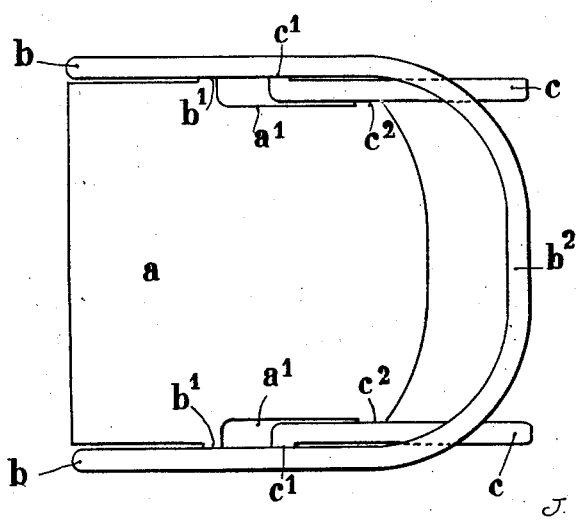

Each leg $b$ is arranged, as shown in Fig. 6, in a vertical plane external to the seat $a$ to which it is secured in an inclined position and it is connected, at a point $c^1$ of its inner face, to the corresponding rear leg $c$ which is also secured at $c^2$ at the rear of the seat $a$, in the bottom of the notches $a^1$ of the latter, as clearly shown in Fig. 6.

Figure 5:
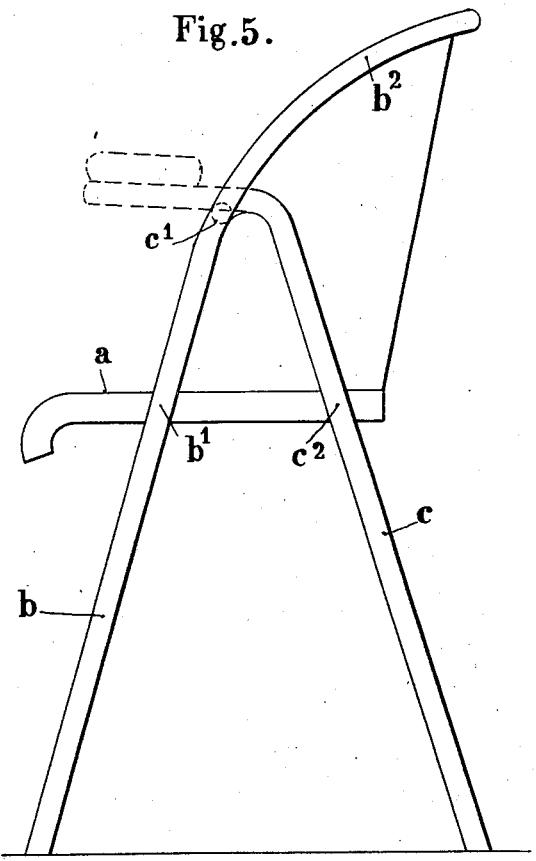

Referring to Fig. 5, it will be understood that the bisector of the angle formed by the legs $b$ and $c$ is vertical and by referring to Fig. 6, it will be seen that the various elements $a$, $c$, $b$ are displaced relatively to each other in such a manner that when the chairs of the arrangement described are superposed as illustrated in Fig. 8, the axis of the pile obtained is vertical and that the cumbersomeness is thus reduced to the strict minimum.

In this form of construction the legs $b$ and $c$ might not be extended above the seat and might be secured to the latter by their upper end.

Figure 9:
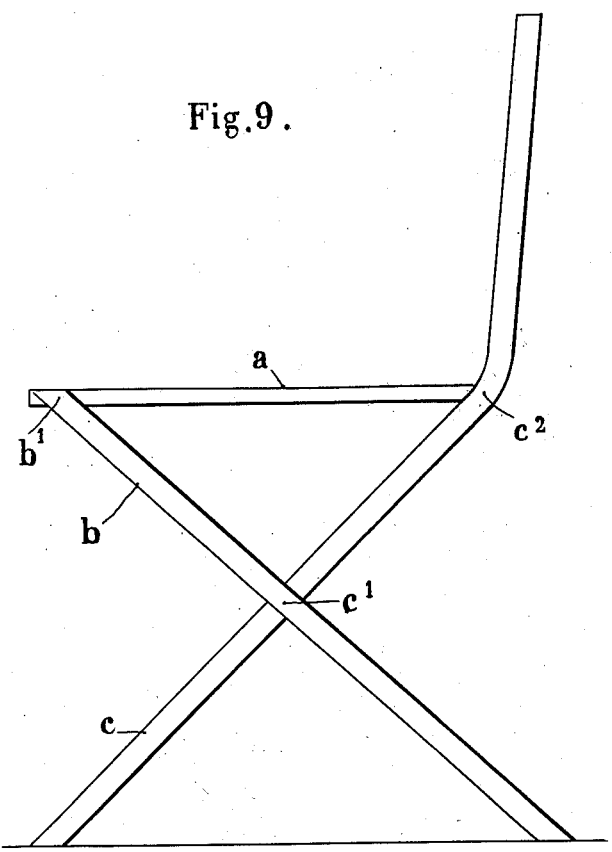
Figure 10:
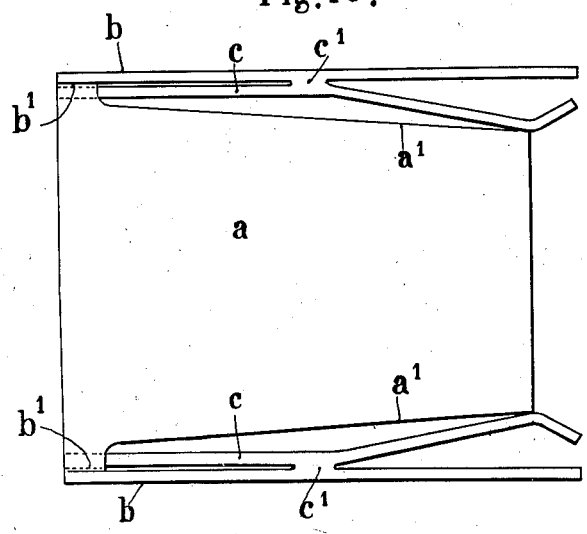

In the modification illustrated in Figs. 9 to 11, the two legs $b$, $c$ are crossed and connected together at $c^1$.

The two legs $b$ are outside and secured at $b^1$ at the front of the seat $a$, whilst the two legs $c$ secured at $c^2$ at the rear of the seat $a$ in the bottom of the notches $a^1$ extend above the said seat for forming the posts or uprights of the back and are arranged on the inside of the legs $b$.

In this arrangement is thus again found the displacement already described between the seat, the legs and the back, so that this chair can be assembled with other similar chairs in the same conditions as the first ones.

The invention can of course be applied to the constitution of any pieces of furniture other than those described.

Referring now to Figs. 12 to 14, it will be seen, for instance, that the surface $a$ might constitute the top of a table, bench or any other piece of furniture without a back.

In this case the displacement between the two pairs of legs $b$ and $c$ and the surface $a$ might be realized by means of arms $d$, $d$ secured on the inside of the legs and at the exterior of the surface $a$, these arms being independent of each other as illustrated in full lines in Fig. 12, or formed by a bent member, as shown in dotted lines in the same figure.

Likewise, it would be possible, by extending two of the arms $d$, as indicated in dotted lines, to constitute a chair different from those described.

The arrangements described are of course given by way of example only, the forms, materials and dimensions of the constituent elements as well as the details of execution can be modified without departing thereby from the principle of the invention. Likewise, the materials used can be of various kinds: wood, metal, cast or moulded materials, etc.

The legs are not necessarily rectilinear and can have the shape of parabola or of any other curve permitting the assemblage. The top of the angle formed by the legs instead of being acute or rounded, as illustrated in the drawing, can have any desired shape.

Moreover, by adding arm-rests to the chairs described with reference to Figs. 1 to 4 and to Figs. 5 to 8, it is easy to obtain arm-chairs presenting the same features as the said chairs.

In Fig. 1 it will be seen that the legs of an arm-chair can, for instance, have the shape shown in dotted lines and can be connected by arm-rests $e$ to the back $g$.

In Fig. 5, the armchair is obtained by horizontally extending the upper end of the legs $c$, as illustrated in dotted lines in this figure.

Finally, it would be possible by juxtaposing several armchairs in accordance with the invention to obtain a stall in which the seats would be separated from each other by the legs common to two adjacent seats.

Claims:—

1. Pieces of furniture capable of being superposed and fitting into each other, comprising: a panel forming the top of the pieces of furniture,—a front leg and a rear leg integral with each other, secured on each of two of the opposite sides of the top, each of such pairs of legs disposed angularly to each other and extending above said top, the pairs of legs lying in planes parallel to each other.

2. Pieces of furniture capable of being superposed and fitting into each other, comprising: a panel adapted to form the seat of a chair,—two pairs of legs integral with each other in each pair, and formed at an angle to each other and secured on two of the opposite sides of the seat, the pairs of legs lying in planes parallel to each other,—a back comprising two posts integral with one of the pairs of legs of the chair.

3. Pieces of furniture capable of being superposed and fitting into each other, comprising: a panel adapted to form the seat of an archair,—two pairs of legs integral with each other in each pair, and formed at an angle to each other and secured on two of the opposite sides of the seat, the pairs of legs lying in planes parallel to each other,—a back comprising two posts integral with one of the pairs of legs,—and an arm-rest connected to the back and to the other pair of legs of the arm-chair.

The foregoing, specification of my "pieces of furniture capable of being superposed" signed by me this 13th day of October, 1927.

JULIEN HENRI PORCHÉ.